United States Patent
Keener

[15] 3,688,412
[45] Sept. 5, 1972

[54] SQUARE GAGE

[72] Inventor: William E. Keener, 869 Fairfax, Birmingham, Mich. 48009

[22] Filed: Aug. 31, 1970

[21] Appl. No.: 68,348

[52] U.S. Cl. ................................. 33/174 M, 33/112
[51] Int. Cl. ............................................ G01b 3/56
[58] Field of Search ........................ 33/174 M, 112

[56] References Cited

UNITED STATES PATENTS

| | | | |
|---|---|---|---|
| 2,379,048 | 6/1945 | Thomas | 33/112 |
| 3,380,165 | 4/1968 | Urban | 33/174 M |
| 3,273,252 | 9/1966 | Bunge | 33/174 M |

FOREIGN PATENTS OR APPLICATIONS

| 39,881 | 1957 | Poland | 33/174 M |
|---|---|---|---|

OTHER PUBLICATIONS

American Machinist, Aug. 31, 1953, p. 118.
Lakso, Machinery, April, 1924, p. 591.

Primary Examiner—Leonard Forman
Assistant Examiner—Dennis A. Dearing
Attorney—Raymond E. Scott

[57] ABSTRACT

This disclosure relates to a toolmaker's square gage or try square and is adapted to indicate the deviation from square of two surfaces of a part. The square gage includes a horizontal beam having a fulcrum point or edge adjacent one end, a fixed upwardly extending gage post secured to the beam, in fixed relation, and a feeler gage secured to the beam, spaced from the post. The gage includes a gage feeler or plunger which engages the supporting surface of the gage and a dial indicator which indicates the linear movement of the feeler; such that the gage reading is proportional to the angle of inclination of the gage post, as it is tilted to engage the part, relative to a predetermined standard.

6 Claims, 3 Drawing Figures

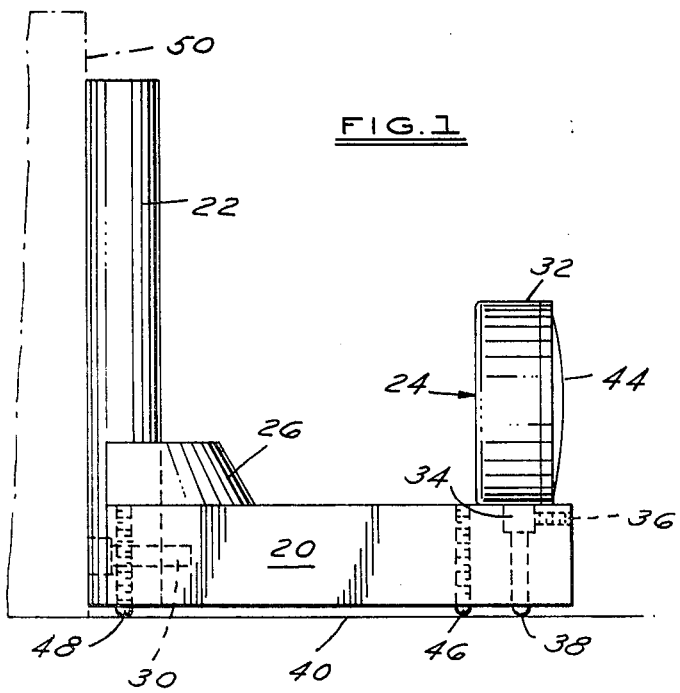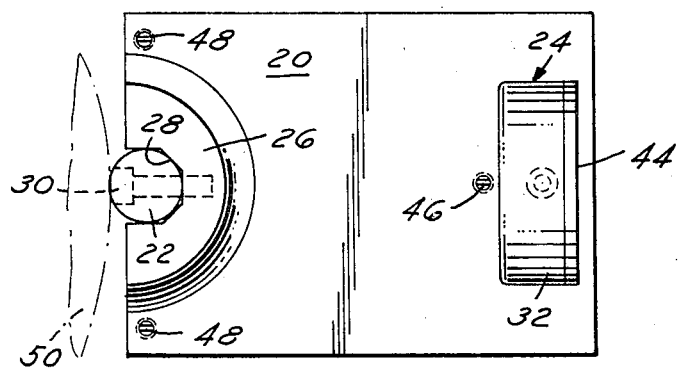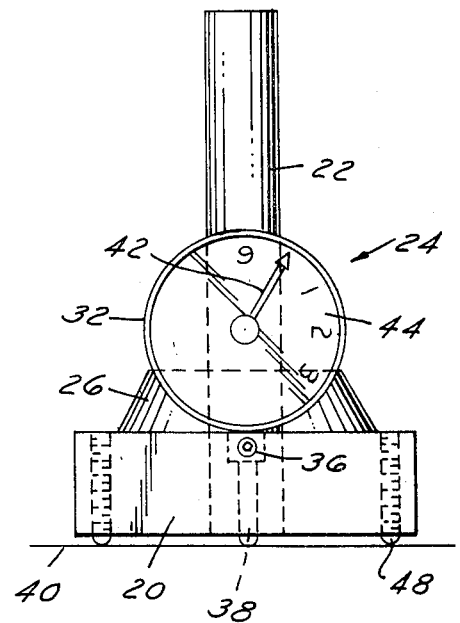

SQUARE GAGE

Field of the Invention

This invention relates to geometrical instruments of the straight-edge type. More particularly, this invention relates to an indicating try square or square gage such as utilized by toolmakers, diemakers and others to determine the deviation from square of a manufactured part.

Description of the Prior Art

The simplest form of the conventional try square includes two straight edges fixed at right angles. The prior art however includes a number of more sophisticated instruments adapted to measure the degree of deviation from square of the surfaces of a part. The vertical leg of these instruments are generally pivotally attached to the horizontal leg and the angle of the vertical leg is indicated by a gage through a plurality of levers or the like. Another form of try square, indicating the deviation from square at various points, includes a feeler gage which is mounted for sliding movement on a fixed vertical leg. Examples of the indicating try squares shown by the prior art include the following U.S. Pat. Nos.: 1,321,038, 2,397,280, 2,487,844, 2,745,183 2,969,597 3,254,416.

The primary objection to these devices is their complexity and relatively large cost when compared to the simple fixed-leg try square. Further, the specification of a machined part, for example, may not require the accuracy built-in to these devices and therefore the complexity and expense may be unnecessary. The need therefore remains for a simple, relatively inexpensive indicating try square, which it is an object of this invention to provide.

Summary of the Invention

The square gage of this invention includes a horizontal beam adapted to overlie the horizontal supporting surface for the gage, an upwardly extending, substantially vertical gage post fixed in relation to the beam, at one end thereof, and a gage operably connected to the horizontal beam, spaced from the gage post. The gage includes a gage feeler or plunger extending downwardly to operably engage the supporting surface and a dial indicator or the like sensing and indicating the linear movement of the gage feeler. The gage post is adapted to be tilted about a fulcrum on the lower surface of the horizontal beam, adjacent the gage post, to contact a surface of the part to be checked. The indicator of the gage is thereby proportional to the movement of the horizontal beam, which is also proportional to the angle of the gage post, relative to the horizontal supporting surface. The square gage of this invention is utilized by setting the gage indicator to a standard, such as a conventional cylinder square or gage block, and comparing the indicator reading with the part to be checked. The difference is proportional to the angle defined between the surface of the part on the support and the surface checked, as will be defined more fully hereinbelow.

The gage post in the preferred embodiment of the invention is cylindrical to provide a vertically extending edge contact with the surface of the part checked, which is the tangent of the cylindrical surface. The fulcrum point of the horizontal beam is preferably provided by one or more adjustable rocker posts adjacent the gage post. Other advantages and meritorious features will more fully appear from the following description of the preferred embodiment, claims and accompanying drawings.

Brief Description of the Drawings

FIG. 1 is a side elevation of one embodiment of the square gage of this invention;

FIG. 2 is a top elevation of the embodiment of the square gage shown in FIG. 1; and FIG. 3 is an end view of the embodiment of the invention shown in FIGS. 1 and 2.

Description of the Preferred Embodiment

The embodiment of the square gage of this invention shown in FIGS. 1 to 3 includes a horizontal beam 20, a cylindrical gage post 22 and a gage member indicated generally at 24. The horizontal beam in this embodiment is a generally rectangular block of metal, such as steel, to provide stability to the instrument, however the shape of the beam is not considered critical to the invention and other suitable materials may also be utilized. An integral boss 26 is provided in this embodiment on the beam member to aid in accurately securing the gage post 22 in fixed relation to the beam. The gage post 22 is received, in this embodiment, in a five sided slot 28 in one end of the horizontal beam member, as shown in FIG. 2, which is actually five sides of an octagonal opening. The slot 28 provides at least a two point contact for the cylindrical post, which permits accurate alignment of the post in the slot. The post is rigidly secured to the beam by a threaded fastener 30 which extends through the post into the beam and the head portion of the fastener is recessed in the post to prevent contact with the part to be checked. It is understood that other suitable means to accurately and rigidly secure the gage post to the beam may also be utilized.

The gage 24 may be a conventional dial indicator or feeler gage as shown. The dial indicator portion 32 may be secured to the horizontal beam member by any suitable means, such as by threading the stem portion 34 into an aperture in the beam member, as shown in FIG. 1, and securing the stem portion with a set screw 36, or the like. The gage feeler or plunger 38 extends downwardly through an aperture in the beam member to contact the supporting surface, shown in phantom at 40, and the gage includes a conventional pointer 42, on the dial face 44, which is responsive to linear movement of the plunger. An adjustable post 46 may be provided on the base of the beam member, adjacent the gage plunger 38, to prevent damage of the plunger spring and gage.

The end of the beam member 20, adjacent the cylindrical gage post, is provided with two downwardly extending rocker posts 48 which support the end of the beam and provide a fulcrum for tilting movement of the gage post.

The rocker posts 48 are preferably adjustable axially to adjust the angular position of the gage post 22 relative to the supporting surface, such that the gage post must be tilted to lie flush against the cylinder square or other standard. The rocker posts are therefore normally adjusted to extend axially further from the base of the beam member 20 than the post 46, however the increment may be only a few thousandths of an inch. In this embodiment, the rocker posts are threadably received in the beam member 20 and adjustable merely by threading the posts into or out of the beam. The surface engaging ends of the rocker posts are preferably spherical to permit tilting of the beam, about the posts, as shown. It will be understood however that the fulcrum may also be integral with the horizontal beam.

The square gage of this invention is utilized by first setting the gage at a standard, and then comparing the reading with the part to be checked. The gage is set by placing the lower end of the gage post 22 against a standard square 50, such as a conventional cylinder square or gage block; the gage post 22 is then tilted about the rocker posts 48 until the post is flush with the surface of the standard, as shown in FIGS. 1 and 2. The post is preferably cylindrical to provide a vertically extending edge contact with the standard, as shown in FIG. 2. The standard is also preferably cylindrical. The post is retained in this position while the pointer 42 of the gage is set to zero, indicating exactly 90° between the position of the gage post and the supporting surface 40. This procedure is then repeated with the part to be checked. The post is tilted flush with the surface of the part and the gage reading is recorded. The gage reading is proportional to the deviation from square of the surfaces of the part checked, as follows: the sine of the deviation angle is equal to the movement of the plunger 38, divided by the distance from the contacting edge of the gage post to the plunger. In view of the fact that the dimensions of the gage are constant for each embodiment of the instrument, the movement of the gage plunger is proportional to the angle of deviation, and the relationship may be provided on a chart for easy reference.

What is claimed is:

1. A square gage adapted to indicate the deviation from square of two surfaces of a part, comprising: a horizontal beam portion adapted to overlie the supporting surface for the gage, a gage post portion extending upwardly at an angle slightly less than vertical from one end of said beam portion and fixed relative thereto, said gage post having a generally vertically extending contact edge opposite said beam portion and extending outwardly from the end there of said beam portion supported on two spaced downwardly extending fulcrum points in a horizontal axis of said gage post portion spaced on opposite sides of said gauge post, such that said gage post portion may be tilted about said fulcrum points to engage the vertical surface of the part to be checked, and a gage means having a spring biased gage feeler extending downwardly from said beam portion, spaced a predetermined distance from said fulcrum points and said beam end, said feeler adapted to operably engage the supporting surface, said gage means having an indicator operably connected to said gage feeler, such that the angle of inclination of said gage post portion, relative to a predetermined standard, is indicated by tilting said gage post portion against the vertical surface of the part to be measured, about said fulcrum points, and comparing the gage indicator reading with a predetermined standard.

2. The square gage defined in claim 1, characterized in that said gage post portion is cylindrical, such that said vertical edge is a vertically extending tangent of said cylindrical post portion, providing an edge contact with the surface to be checked.

3. The square gage defined in claim 1, characterized in that said horizontal beam portion includes at least one downwardly extending rocker post, adjacent said gage post portion, adapted to engage the supporting surface and providing said fulcrum point about which the post portion may be tilted to contact the surface of the part to be checked.

4. The square gage defined in claim 3, characterized in that said horizontal beam is a beam block having two spaced rocker posts.

5. A square gage adapted to indicate the deviation from square of two surfaces of a part on a supporting surface, comprising: a horizontal beam member adapted to overlie the supporting surface having two spaced projecting fulcrum points adjacent one end, a cylindrical gage post, rigidly secured to said horizontal beam member at said one end, between said fulcrum points said gauge post having a vertical contact surface spaced outwardly from said one end, the longitudinal axis of said gage post intersecting the line defined between said fulcrum points, said gage post extending upwardly at slightly less than a right angle relative to said beam member and adapted to be tilted, about said fulcrum points, to engage a surface of the part to be checked by said contact surface and a gage means secured to said beam member, spaced inwardly from said gage post and said fulcrum points, having gage feeler means spring biased downwardly from said horizontal beam member spaced a predetermined distance from said gage post and adapted to engage the supporting surface, said gage means having an indicator operably connected to said gage feeler means, such that the angle of inclination of said gage post, relative to a predetermined standard, is indicated by said gage means.

6. The square gage defined in claim 5, characterized in that said beam member includes a support post, adjacent said gage feeler means, shorter in length than said projecting fulcrum points and protecting said feeler means.

* * * * *